US009305461B2

(12) United States Patent
Elzein et al.

(10) Patent No.: US 9,305,461 B2
(45) Date of Patent: Apr. 5, 2016

(54) METHOD AND APPARATUS FOR VEHICLE TO VEHICLE COMMUNICATION AND INFORMATION RELAY

(71) Applicant: Ford Global Technologies, LLC, Dearborn, MI (US)

(72) Inventors: Hadi Elzein, Dearborn, MI (US); Jeffrey Raymond Ostrowski, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/260,359

(22) Filed: Apr. 24, 2014

(65) Prior Publication Data

US 2015/0310740 A1 Oct. 29, 2015

(51) Int. Cl.

| | |
|---|---|
| ***G08G 1/00*** | (2006.01) |
| ***G08B 1/08*** | (2006.01) |
| ***G08G 1/09*** | (2006.01) |
| ***H04W 24/00*** | (2009.01) |
| ***G08G 1/0965*** | (2006.01) |

(52) U.S. Cl.
CPC .................................... *G08G 1/0965* (2013.01)

(58) Field of Classification Search
CPC ........................................................ G08G 1/00
USPC ........................................................ 340/902
See application file for complete search history.

(56) References Cited

U.S. PATENT DOCUMENTS

| | | | | |
|---|---|---|---|---|
| 7,027,772 | B2 | 4/2006 | Chen et al. | |
| 8,014,752 | B2 | 9/2011 | Chen et al. | |
| 8,396,449 | B2 | 3/2013 | Hatton | |
| 2002/0035422 | A1* | 3/2002 | Sasaki | 701/35 |
| 2004/0075553 | A1* | 4/2004 | Ono | 340/539.13 |
| 2009/0289812 | A1* | 11/2009 | Kim et al. | 340/905 |
| 2011/0201302 | A1 | 8/2011 | Hatton | |

* cited by examiner

*Primary Examiner* — Jennifer Mehmood
*Assistant Examiner* — John Mortell
(74) *Attorney, Agent, or Firm* — Jennifer M. Stec; Brooks Kushman P.C.

(57) ABSTRACT

A system includes a processor configured to detect a primary vehicle emergency-state. The processor is also configured to determine that emergency-services communication through an on-board device is not possible. Further, the processor is configured to search for a secondary vehicle having vehicle-to-vehicle communication capabilities. The processor is additionally configured to send an emergency-services request to the secondary vehicle to establish communication with the secondary vehicle and send prioritized emergency data to the secondary vehicle.

14 Claims, 4 Drawing Sheets

METHOD AND APPARATUS FOR VEHICLE TO VEHICLE COMMUNICATION AND INFORMATION RELAY

TECHNICAL FIELD

The illustrative embodiments generally relate to a method and apparatus for vehicle to vehicle communication and vehicle to vehicle information relay.

BACKGROUND

Vehicle telematics systems provide the ability for communication between a vehicle and remote entities. In many instances, this can be used to obtain traffic and navigation data, and other items, such as media, that are of interest to drivers. Also, telematics systems provide the capability to contact emergency services if a vehicle is in an accident. In some instances, the vehicle may use an embedded modem to contact an outside source, and in other instances, the vehicle may use a driver's mobile device.

While use of an in-vehicle communication provider is convenient, problems may arise if the device is damaged or disabled in an accident. If the vehicle is reliant on an in-vehicle system to contact emergency services, and the device is damaged, the occupants may be unable to have emergency services contacted automatically. Since the occupants may also be injured, it may be difficult for the occupants to obtain assistance.

U.S. Pat. No. 8,396,449 generally relates to an emergency response system including a restraint control module (RCM), a global positioning system module (GPSM), at least one output, at least one input, an SPDJB, and a vehicle associated computing system (VACS) in communication with the RCM, the GPSM, the at least one output, the at least one input and the SPDJB. Upon detection of an emergency event, the RCM requests that the VACS place an emergency call. Upon receiving a request from the RCM, the VACS queries the GPSM to obtain vehicle coordinates, informs the occupant of the onset of the call, and instructs a wireless device in communication with the VACS to place an emergency call. The VACS is operable to determine when an emergency call is connected. Once the emergency call is connected, the VACS relays a message indicating connection to the RCM, and contacts the SPDJB to contacts the Smart Power Distribution Junction Box (SPDJB).

U.S. Pat. No. 8,014,752 generally relates to automatic utilization of cellular telephone device being achieved by a controller and a short-range wireless communicator mounted on a vehicle, the short-range wireless communicator having a peer-to-peer communications capability; responsive to an emergency notification message, pinging by the short-range wireless communicator a long-range communication device contemporaneously within range of the peer-to-peer communications capability, the long-range communication device being physically detached from the vehicle; subsequent to the pinging, receiving a response message indicating that user authorization is required; responsive to the response message, sending by the short-range wireless communicator to the long-range communication device a request for authorization message; subsequent to a user responding in an affirmative manner to the authorization request, receiving an authorization message to co-opt the long-range communication device; and responsive to the authorization, sending an emergency notification message from the short-range wireless communicator through the co-opted long-range communication device to a specified recipient party.

SUMMARY

In a first illustrative embodiment, a system includes a processor configured to detect a primary vehicle emergency-state. The processor is also configured to determine that emergency-services communication through an on-board device is not possible. Further, the processor is configured to search for a secondary vehicle having vehicle-to-vehicle communication capabilities. The processor is additionally configured to send an emergency-services request to the secondary vehicle to establish communication with the secondary vehicle and send prioritized emergency data to the secondary vehicle.

In a second illustrative embodiment, a system includes a vehicle-based processor configured to receive an emergency-services request from a primary vehicle in an emergency state. The processor is also configured to establish vehicle-to-vehicle communication with the primary vehicle. Further, the processor is configured to receive emergency data from the primary vehicle and send a communication requesting emergency services on behalf of the primary vehicle.

In a third illustrative embodiment, a system includes a processor configured to receive an emergency communication from a secondary vehicle, sent on behalf of a primary vehicle. The processor is also configured to compare an emergency communication identifier to any previously received emergency communication identifiers to determine if the emergency communication is duplicative. Further, the processor is configured to send a request to an emergency-services provider, based on a non-duplicate emergency communication, including emergency data received as part of the communication that is not duplicative of already sent emergency data.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
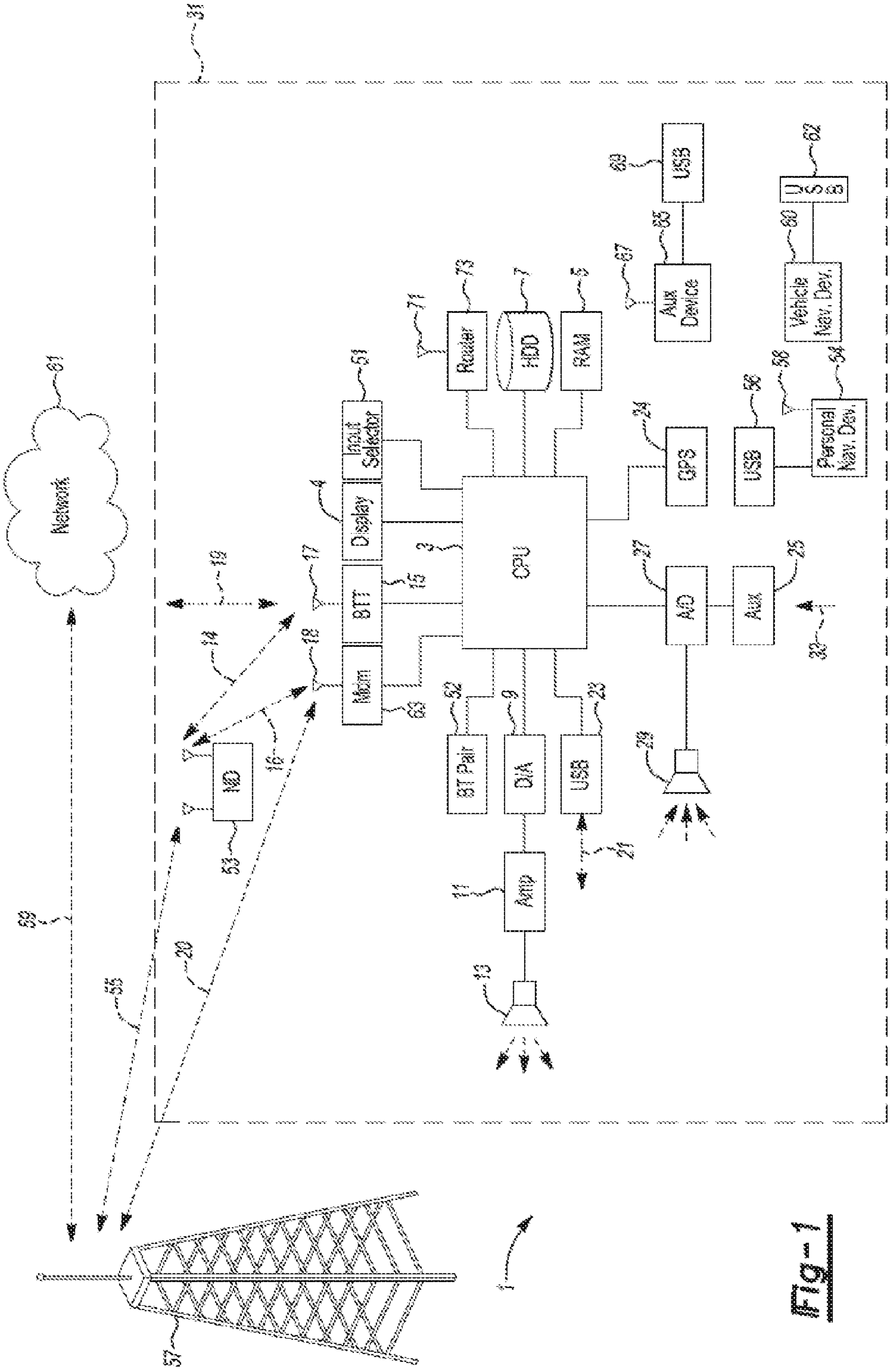
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a universal serial bus (USB) input 23, a global positioning system (GPS) input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a controller area network (CAN) bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as personal navigation device (PND) 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, personal digital assistant (PDA), or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the central processing unit (CPU) is instructed that the onboard BLUETOOTH transceiver will be paired with a BLUETOOTH transceiver in a nomadic device.

Data may be communicated between CPU 3 and network 61 utilizing, for example, a data-plan, data over voice, or dual-tone multi-frequency (DTMF) tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as infrared data association (IrDA)) and non-standardized consumer infrared (IR) protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of with Code Domian Multiple Access (CDMA), Time Domain Multiple Access (TDMA), Space-Domian Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

Typical telematics systems utilize some form of on-board communication to contact remote entities when data transfer is desired. Whether through an on-board modem or a driver's personal communication device, data commonly flows to and from the vehicle in a self-contained system. If the communication device is damaged, however, this can create issues with connection to needed remote services in the event of an accident.

In the illustrative embodiments, vehicle-to-vehicle communication is contemplated, wherein a driver in, for example, an emergency condition, can utilize the resources available to another vehicle to contact an emergency services provider.

In the illustrative examples, vehicle telematics systems are capable of short range communication with other vehicle telematics systems, using, for example, WiFi or BLUETOOTH communication. Other forms of local communication, usable to contact localized vehicles, may also be utilized. Once connection to another vehicle (with presumably working communication with remote entities) is established, the damaged vehicle can use the working communication to request emergency assistance.

The same model of local communication can be used to convey information from vehicle to vehicle, such as traffic, weather or other useful information relating to conditions recently "observed" by one of the two vehicles. So, for example, cars traveling in different directions on a road can relay information about traffic conditions previously experienced and or received from other vehicles along a road. While traffic flow may be different in different directions along a same road (i.e., traffic reports on a south-bound side of a road may not be as useful to a north-bound vehicle), information received from other vehicles further north along the road, and headed north, can be relayed to vehicles further south along the road. Essentially, a south-bound vehicle can be used as a relay to convey information from vehicles at different points on the north-bound side, informing vehicles further south what they can expect when headed in the north-bound direction.

Figure 2:
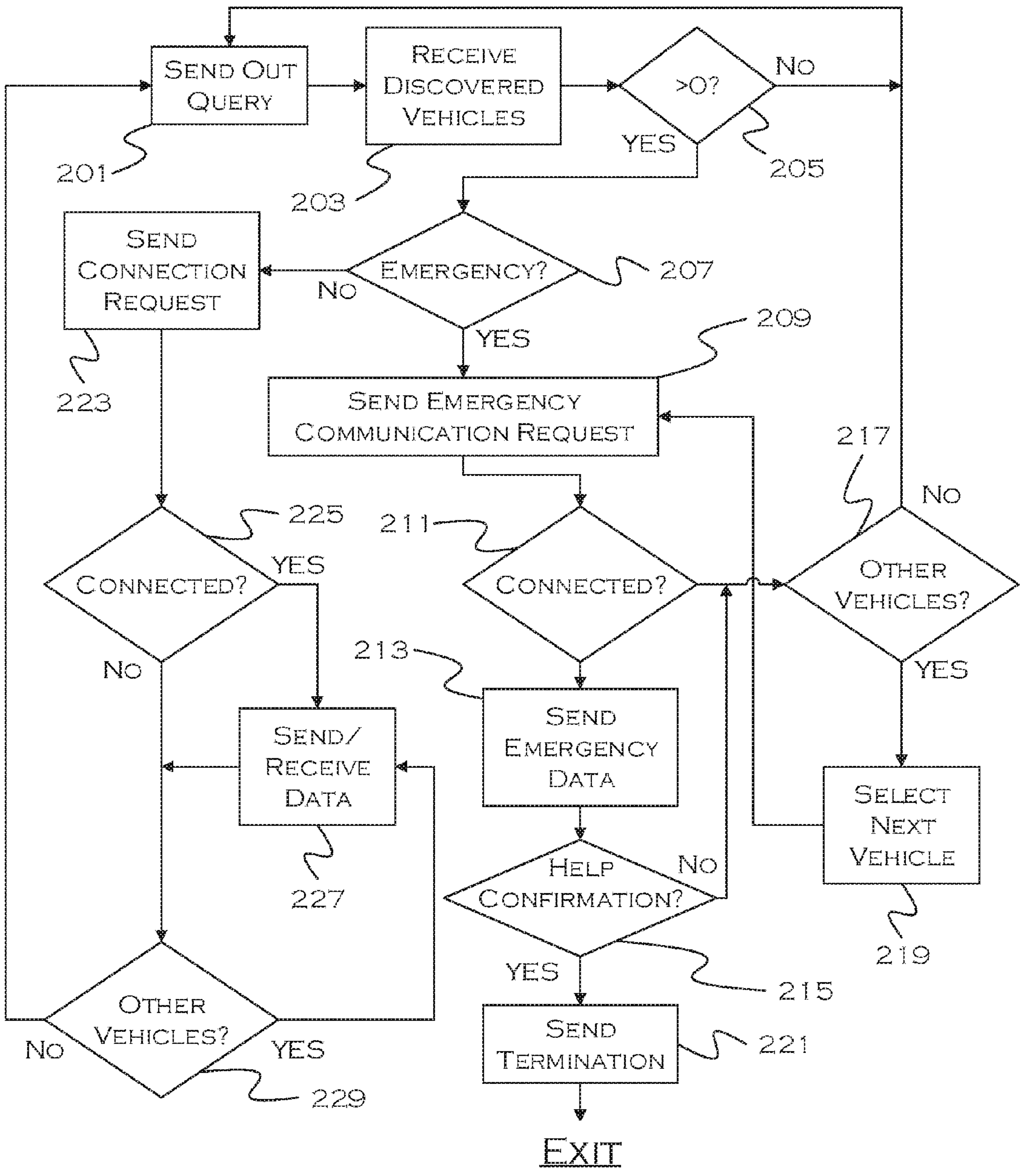
FIG. 2 shows an illustrative process for vehicle-to-vehicle communication.

FIG. 2 shows an illustrative process for vehicle-to-vehicle communication. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative embodiment, a primary vehicle (referred to as such for illustrative purposes only) desires to connect with a secondary vehicle. This connection could be for exchange of information, or to utilize the secondary vehicle's connection services in the event of an emergency, when onboard communication with emergency services fails. Of course, it is also possible that the vehicle will not attempt to find other vehicles with which to communicate, unless an emergency occurs and onboard communication is not available. Such a procedure is discussed more with respect to FIG. 3.

In the embodiments shown in FIG. 2, vehicles exchange various types of information with other similarly telematics equipped vehicles, to create an ad-hoc network of data sharing. Since the vehicle is constantly (or at least periodically) attempting to communicate with other vehicles, it will likely know which vehicles are available for use in remote communication in the event of a vehicle emergency.

In this illustrative example, the vehicle sends out a communication query to other local vehicles 201. Specifically, the vehicle is searching for other vehicles with which it can communicate over short range communication, such as low energy BLUETOOTH. If other vehicles are discovered, the process will receive a list of those discovered vehicles 203, and can determine which, if any, should be used for ad-hoc communication.

As long as there are more than zero discovered vehicles 205, the process can proceed. Otherwise, the process may elect to continue querying for local, connectable vehicles, until a suitable vehicle is discovered.

In this example, it is possible the query was sent as the result of an emergency state, wherein on-board long-range communication has been disabled or is otherwise unavailable. If an emergency condition exists 207, the process will send out an emergency communication request to other local vehicles 209.

In some instances, it may be the case that a driver disables vehicle-to-vehicle communication for general information exchange. In this case, however, it is contemplated that, when an emergency occurs, communication rejection by a secondary vehicle is over-ridden, for the sake of safety. If the emergency communication request results in a connection 211, the process can send a request from the primary vehicle to the secondary vehicle for emergency services 213.

In many instances, the secondary vehicle may only be in range for a very brief time. Accordingly, it may be difficult to utilize the secondary vehicle resources to maintain an emergency communication. But, important data can be quickly transferred to the secondary vehicle (e.g., without limitation, accident location, number of occupants, and any other brief, relevant data). The secondary vehicle, even if it has moved on out of a communication range, can then communicate with an emergency services provider or relay, to alert the appropriate parties, even if the secondary vehicle is no longer in communication with the primary vehicle. Of course, if communication with the primary vehicle is no longer established, the secondary vehicle will only be able to relay information already received, which is why it may be beneficial to transfer the most important information (e.g., location of accident) first.

If the secondary vehicle receives a suitable amount of information and is able to send an assistance request while still in communication with the primary vehicle, the primary vehicle may receive a confirmation that a help request has been sent 215. If desired, at this point, assuming there is no additional information that needs to be relayed through secondary vehicles, the primary vehicle can send a termination request, cancelling the remaining help requests 221.

If the secondary vehicle does not send a confirmation, or if communication cannot be established with a first secondary vehicle, the process may continue to check for additional secondary vehicles 217. For each additional secondary vehicle 219, the process may be repeated until no secondary vehicles remain, or a confirmation of a help request is received and/or there is no more data to confer.

As long as communication persists with at least one secondary vehicle, additional information can be sent for relay to an emergency services provider. Even if communication is broken, as a first secondary vehicle moves out of range, the process can continue to search for additional secondary vehicles, until all relevant information has been relayed and/or confirmed.

If the query for secondary vehicles was not initiated as a result of an emergency and/or doesn't involve emergency communication 207, the process may send a general connection request 223. This request, unlike the emergency services request, in this example, can be ignored by vehicles equipped with telematics units but whose occupants do not wish to communicate with other vehicles. In other models, communication between equipped vehicles may simply always be enabled.

If the communication request is accepted by the secondary vehicle 225, the process can exchange any relevant data 227. This includes, but is not limited to, weather data, traffic data, game data (for ad-hoc gaming), and any other pertinent data. In at least one example, this could even include emergency data from another vehicle. For example, if vehicle A gets in an accident and contacts vehicle B, the emergency data may be transferred to vehicle B. But, if vehicle B does not have a communication connection with long range capability (e.g., the driver's phone is dead), vehicle B may carry the information until it communicates with vehicle C. Vehicle C, receiving the information and having the appropriate telematics services, can then communicate the emergency to a services provider. Such a paradigm may be very useful for accidents in remote areas where few vehicles may pass by.

Once any data exchange is completed, or during the data exchange, the process can continue to attempt to communicate and to communicate with other vehicles 229. In this manner, useful information can be relayed between vehicles as they travel down roads. Even road-condition information could be relayed, which could help identify slippery or otherwise unsafe road conditions long before any information providing source might have the information.

Figure 3:
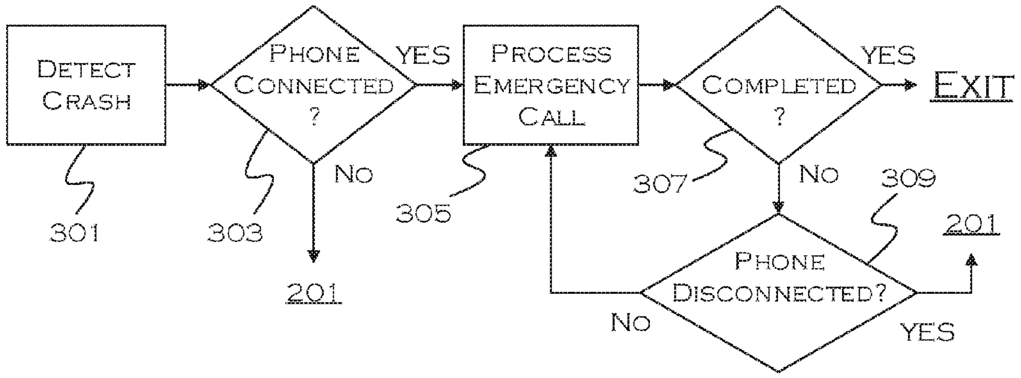
FIG. 3 shows an illustrative example of a process for emergency call placement.

FIG. 3 shows an illustrative example of a process for emergency call placement. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This illustrative example provides an instance of a process that seeks to complete an emergency call through an on-board communication device first, in the event of a crash, and then seeks an offboard communication device in the event that an issue with the onboard device occurs.

After the crash has been detected 301, the process first determines if a phone (or other similar communication device) is connected to the vehicle 303. The connected phone or similar communication device will be the communication device of preference for this process, but if the phone is not currently connected (e.g., the driver forgot it or it has powered down), the process will proceed to step 201 of FIG. 2, for example, to search for other vehicles. Other suitable search and connect algorithms, other than FIG. 2, are also contemplated.

If the phone is currently connected 303, the process will use the connected phone to place a call 305. While this procedure will work as long as the connected phone stays connected and powered, if there is a loss of power to the phone or it is otherwise disconnected from the system (damaged in the accident, for example), the process may be unable to finish the call.

If the call is not yet completed 307 and there is a disconnection of a connected phone 309, the process may proceed to step 201 or a similar algorithm to attempt to communicate any remaining emergency information through use of secondary vehicles as described herein.

Figure 4:
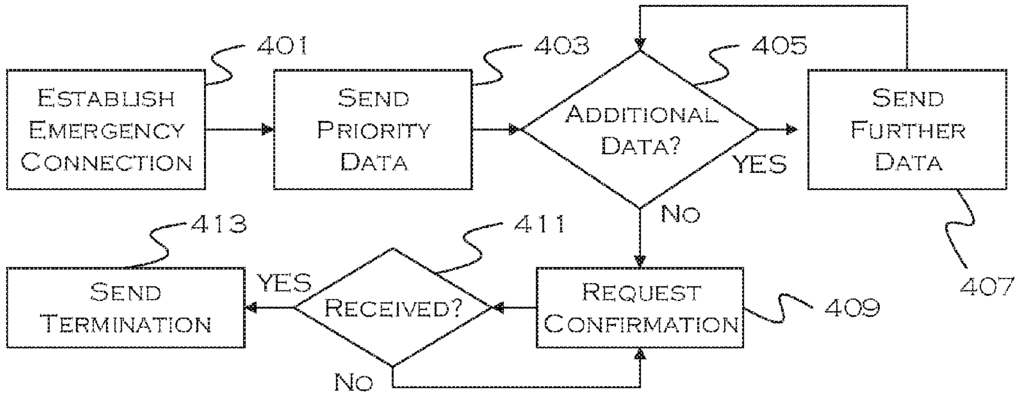
FIG. 4 shows an illustrative example of a process for emergency call communication.

FIG. 4 shows an illustrative example of a process for emergency call communication. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As previously noted, the connection between any two vehicles may be brief. While it may be extended by vehicles traveling at the same speed, or stop signs or street lights, generally, any two vehicles will not remain in close proximity for long. This is even more true when one of the vehicles is crashed on the side of the road, and the other vehicle is traveling by.

Accordingly, it is desirable to establish quick and easy communication between the vehicles and to convey relevant emergency data to the secondary vehicle as quickly as possible 401. In this illustrative example, once emergency communication has been established, priority data is transmitted 403. This can include, but is not limited to, accident location, vehicle type, occupant information, etc. In one example, very basic information can be sent in a first packet, such as location information. Additional important information can be sent in a second or subsequent packets, based on how critical the information is deemed to be. For example, if the vehicle senses a fuel leak, or if airbags have deployed, the process could send this information in the first or in a second packet. By keeping the initial packets small, the chance that a complete, important packet is able to be delivered is possible.

Once the initial data has been sent, the process determines if there is any additional data that needs to be conveyed 405. This can include less important data, but data that may still be useful to assist in responding to the accident. If there is additional data, the process will continue to attempt to send the additional data 407 until all the relevant data has been sent.

In addition to sending the relevant data, the process may request a confirmation from one or more of the secondary vehicles. In this example, the confirmation is requested once all data has been sent 409, but in another example, the confirmation may be requested once any data has been sent.

The confirmation can be a confirmation that the data has been received, but in at least one example, the confirmation is a confirmation that a distress message has actually been sent to a remote server. This allows the primary vehicle to know that help has been contacted, and it can stop sending a distress signal relayed through secondary vehicles. Multiple confirmations for each data packet may be requested, and as each packet is relayed and the relay is confirmed, those packets can stop being sent. Once a confirmation (for all the data or an individual packet or packets) has been received 411, the process can send a termination signal with respect to the confirmed data to all secondary vehicles still in communication with the system 413.

For example, if a user had an accident in busy highway traffic during rush hour, ten to fifteen vehicles might be available as secondary vehicles for some period of time, if traffic was moving slowly. Since the user doesn't need fifteen copies of a distress message sent, once one vehicle had confirmed sending any or all of the relevant data, the primary vehicle could instruct the other vehicles not to attempt to send that particular data. If multiple requests had already been sent, that could be addressed on the receiving end.

Figure 5:
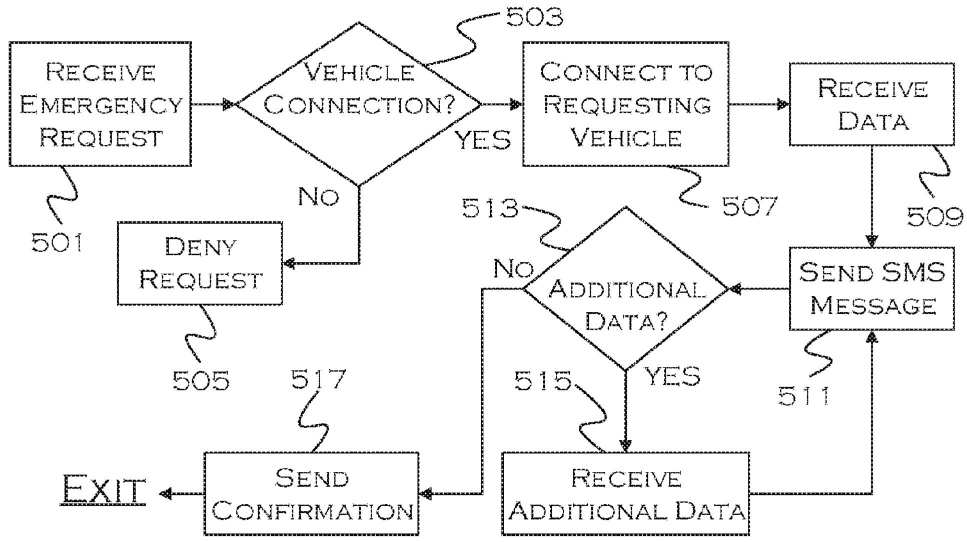
FIG. 5 shows a further illustrative process for emergency call communication.

FIG. 5 shows a further illustrative process for emergency call communication. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this illustrative example, the process for handling a relay at a secondary vehicle is received. The secondary vehicle receives the request 501, and, in this example, checks to see if it has an available remote communication device enabled 503. In some examples, the vehicle may receive and handle the request regardless of remote communication capability, since the request could be further relayed as previously described. In this example, however, the process denies the request if there is no remote communication in the secondary vehicle, since the vehicle cannot process the request by contacting emergency services on behalf of the primary vehicle 505.

If there is remote communication available to the secondary vehicle, the process may connect to the requesting vehicle 507 and receive relevant emergency data 509. As noted, an initial packet or packets of the most relevant data may initially be received and handled. In this example, in order to provide emergency assistance as soon as possible, the secondary vehicle will send a text message (SMS message) to an appropriate source, conveying the necessary information.

While it may be possible to utilize the ad-hoc network, in conjunction with secondary vehicle communication, to place an actual emergency call, this could be difficult as it relies on the secondary vehicle remaining in communication range with the primary vehicle. Accordingly, in this example, the secondary vehicle instead sends an SMS message that conveys the relevant information 511. In this example, the SMS message is sent to an OEM server or third party emergency server for handling. This solution allows the emergency server to obtain additional information relating to the vehicle (make, model, safety systems, etc) for conveyance to an emergency service provider. Of course, if desired and the capability exists with the emergency service provider to receive text messages, the vehicle could send the message to the emergency service provider directly.

Once the SMS message has been sent, the process checks to see if there is additional data that may need to be sent 513. This could be data that is useful to emergency services, but that is not the most essential data for responding to the accident. If there is any additional data, the data can be received 515 and sent as SMS messages, until all relevant data is received and sent. At this point, if desired, a confirmation message can be sent to the primary vehicle 517.

In an alternative embodiment, the secondary vehicle may first receive the initial data and send an initial message. Then, all further data may be received until either no data remains or a connection with the primary vehicle is broken. At this point, the additional data may be sent as a single message. In still another embodiment, as much data as possible may be received before sending the initial message. Any suitable variation on this model is contemplated as being within the scope of the invention.

Figure 6:
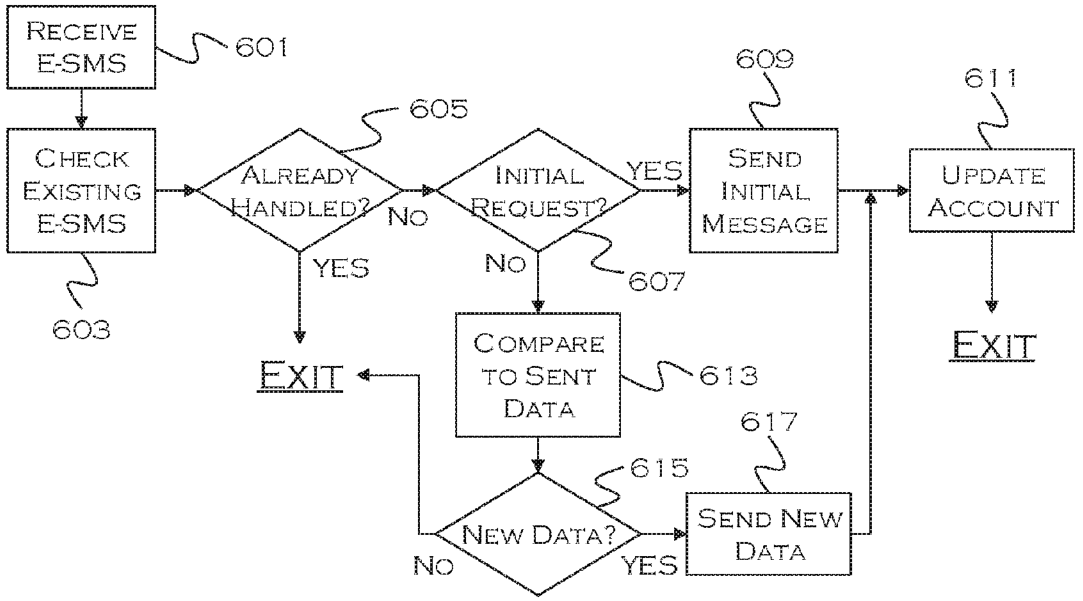
FIG. 6 shows an illustrative process for emergency call handling.

FIG. 6 shows an illustrative process for emergency call handling. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

This process shows a server-side process for emergency call handling. In at least one model, messages or communication relating to the primary vehicle is sent to an emergency situation handling server. Since this server receives all emergency communication, the process will be able to eliminate duplicate requests before those requests reach an actual emergency services provider. In this manner, if there are a number of secondary vehicles placing a request on behalf of the primary vehicle, emergency services are not bombarded with extraneous requests.

The process receives, in this example, an emergency SMS from a secondary vehicle 601. Before further handling the request, the process checks to see if there are any existing SMS messages of a similar nature relating to the same accident 603. This can be done by comparing location information, primary vehicle identification numbers, or any other suitable identifier that can be used to uniquely identify the accident. If the current request has already been handled 605, the process can ignore the incoming SMS message.

If the current request has not yet been handled, the process may determine if the request is a new (e.g., initial) request for help 607. If the request is an initial request, the process may send an initial help request to emergency services 609. A user account related to the primary vehicle may then be updated 611, so that future requests can be handled accordingly (e.g., ignored if already handled).

If the current request is not an initial request, the process may compare any data in the message to data already relayed to the emergency services provider 613. This can help avoid duplicate relay of data to the provider. If the data is new data 615, the process will send the new data to the services provider 617.

For example, without limitation, a primary vehicle may contact three secondary vehicles and need to send three packets of data. All three vehicles may send the first packet, as an SMS in this example, two of the vehicles may remain connected long enough to send the second packet, and one vehicle may send the third packet.

When the first packet is received, for the first time, the packet will indicate the emergency and emergency services may be contacted. When the first packet is received the second and third times, the packet will be ignored, because emergency services have already been contacted. Then, when the second packet is received for the first time, the additional data will be relayed to emergency services. When the second packet is received again, it will be ignored, because the data will have already been sent. Finally, when the third packet is received, the data will be relayed because this data has not yet been sent. In this manner, the process can assist in avoiding sending redundant data to emergency services, while at the same time relaying as much new relevant data as is received.

Figure 7:
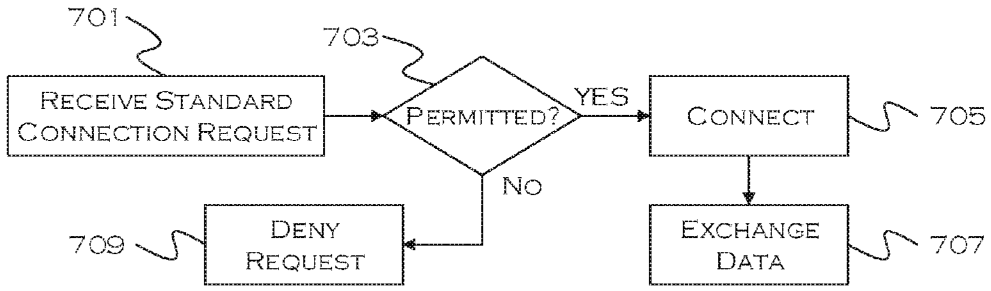
FIG. 7 shows an illustrative process for vehicle-to-vehicle connection.

FIG. 7 shows an illustrative process for vehicle-to-vehicle connection. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In this example, a standard connection request is being handled. In this example, it is contemplated that a driver can decide whether or not to exchange communication with a vehicle computing system in another vehicle. While emergency service requests, in some examples, may be processed regardless of driver preferences, in the interest of safety, other data exchange requests may be accepted or denied by a driver.

Here, the standard non-emergency connection request is received by the secondary vehicle 701. If such requests are permitted 703, the process will connect to the primary vehicle 705. Otherwise, the process will reject the request 709. If the process has connected to the secondary vehicle, relevant data may be exchanged 707. This data can include, but is not limited to, road condition data, traffic data, weather data, etc. Even social data may be exchanged, for example, a driver could receive a play-list from another vehicle in case the driver wanted a random suggestion for some music to listen to. Any useful or relevant data may be exchanged in this manner.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:

a processor configured to:

detect a primary-vehicle emergency-state;

determine that emergency-services communication through an on-board device is not possible;

search for a secondary vehicle having vehicle-to-vehicle communication capabilities;

send an emergency-services request to the secondary vehicle to establish communication with the secondary vehicle;

send prioritized emergency-data to the secondary vehicle; and receive confirmation from the secondary vehicle that the secondary vehicle has sent the emergency request to emergency services.

2. The system of claim 1, wherein the processor is configured to send the prioritized emergency data until no data remains to be sent.

3. The system of claim 1, wherein the processor is configured to terminate emergency-service requests to additional secondary vehicles once confirmation is received.

4. The system of claim 1, wherein the processor is configured to send instructions to terminate emergency requests from additional secondary vehicles once confirmation is received.

5. The system of claim 1, wherein the processor is configured to search for and send requests and data to a plurality of secondary vehicles.

6. The system of claim 1, wherein the processor is configured to prioritize emergency data and send a single packet containing highest priority data first.

7. The system of claim 6, wherein the highest priority data includes a primary vehicle location.

8. The system of claim 6, wherein the highest priority data includes primary vehicle emergency mitigation system activation.

9. A system comprising:

a vehicle-based processor configured to:

receive an emergency-services request from a primary vehicle in an emergency state;

establish vehicle-to-vehicle communication with the primary vehicle;

receive emergency data from the primary vehicle;

send a communication requesting emergency services on behalf of the primary vehicle; and send a confirmation to the primary vehicle after the communication requesting emergency services has been sent.

10. The system of claim 9, wherein the emergency data is prioritized.

11. The system of claim 10, wherein the processor is configured to send a first communication once a predefined threshold level of information has been received.

12. The system of claim 11, wherein the processor is configured to send a secondary communication with additional emergency information after the first communication has already been sent.

13. The system of claim 9, wherein the communication includes an SMS message.

14. The system of claim 9, wherein the processor is configured to ignore a do-not-communicate state of a secondary vehicle in which the processor resides, if the request is an emergency services request.

* * * * *